(12) United States Patent
Shi et al.

(10) Patent No.: US 8,787,440 B2
(45) Date of Patent: Jul. 22, 2014

(54) DETERMINATION OF RECEIVE DATA VALUES

(75) Inventors: Jun Shi, San Diego, CA (US); David Jonathan Julian, San Diego, CA (US); Amal Ekbal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 840 days.

(21) Appl. No.: 12/360,305

(22) Filed: Jan. 27, 2009

(65) Prior Publication Data

US 2010/0020863 A1 Jan. 28, 2010

Related U.S. Application Data

(60) Provisional application No. 61/083,788, filed on Jul. 25, 2008.

(51) Int. Cl.
*H03K 9/04* (2006.01)

(52) U.S. Cl.
USPC .......................................................... 375/239

(58) Field of Classification Search
USPC ......... 375/130, 138, 139, 238, 239, 255, 340, 375/341, 342, 364, 256; 370/212, 213; 329/311–313
See application file for complete search history.

(56) References Cited

U.S. PATENT DOCUMENTS

| | | | |
|---|---|---|---|
| 5,687,169 A | 11/1997 | Fullerton | |
| 5,764,696 A | 6/1998 | Barnes et al. | |
| 5,812,081 A | 9/1998 | Fullerton | |
| 5,832,035 A | 11/1998 | Fullerton | |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |
| 5,995,534 A | 11/1999 | Fullerton et al. | |
| 6,031,862 A | 2/2000 | Fullerton et al. | |
| 6,091,374 A | 7/2000 | Barnes | |
| 6,111,536 A | 8/2000 | Richards et al. | |
| 6,133,876 A | 10/2000 | Fullerton et al. | |
| 6,177,903 B1 | 1/2001 | Fullerton et al. | |
| 6,218,979 B1 | 4/2001 | Barnes et al. | |

(Continued)

FOREIGN PATENT DOCUMENTS

| | | | |
|---|---|---|---|
| JP | 5252074 A | 9/1993 | |
| JP | 2000013277 A | 1/2000 | |

OTHER PUBLICATIONS

International Search Report and Written Opinion—PCT/US2009/051729, International Search Authority—European Patent Office—Nov. 19, 2009.

*Primary Examiner* — Young T. Tse
(74) *Attorney, Agent, or Firm* — Paul S. Holdaway

(57) ABSTRACT

Adverse effects associated with collisions in a wireless communication system are mitigated by defining one or more values for receive data. Here, data that is expected to be received during a data transmission may be set to a defined value. In some cases the defined value is a predefined value (e.g., zero or some other value). In some cases the defined value is based on noise and/or signals levels in the system. In some implementations a device may define receive data values for a period of time during which data is expected to be received and during which a transmission occurs. In some aspects a hybrid on-off keying scheme is employed to determine received data values.

82 Claims, 9 Drawing Sheets

(56) References Cited

U.S. PATENT DOCUMENTS

| | | |
|---|---|---|
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,873,825 B2 | 3/2005 | Pattabiraman |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 2005/0031021 A1* | 2/2005 | Baker et al. ............ 375/142 |
| 2007/0135079 A1 | 6/2007 | Bromley |
| 2007/0291684 A1* | 12/2007 | Lee et al. ............ 370/328 |
| 2008/0231498 A1* | 9/2008 | Menzer et al. ............ 342/134 |
| 2008/0304557 A1* | 12/2008 | Hollis ............ 375/231 |
| 2010/0020864 A1* | 1/2010 | Matsuo et al. ............ 375/239 |

\* cited by examiner

DETERMINATION OF RECEIVE DATA VALUES

CLAIM OF PRIORITY

This application claims the benefit of and priority to commonly owned U.S. Provisional Patent Application No. 61/083,788, filed Jul. 25, 2008, the disclosure of which is hereby incorporated by reference herein.

BACKGROUND

1. Field

This application relates generally to wireless communication and more specifically, but not exclusively, to determining values for receive data.

2. Introduction

In a wireless communication system, a given device transmits signals to and receives signals from at least one other device. In the absence of an orthogonal access scheme, more than one of these devices may transmit at the same time. Conventionally, such an event may be referred to as a collision. In general, it is desirable to avoid collisions because the collisions may adversely affect the ability of a device to receive a signal from another device. For example, a device may not be able to receive signals when it is transmitting because this transmission may overwhelm the device's receiver.

Some communication systems employ system-wide time division multiplexing or frequency division multiplexing to avoid collisions. For example, in a time division multiplexing scheme one device may transmit during certain designated timeslots and receive during other timeslots. Similarly, in a frequency division multiplexing scheme one device may transmit using certain designated frequencies and receive using other frequencies.

Other types of communication systems may not employ system-wide time and/or frequency division multiplexing, however. For example, some systems require low complexity, low cost, and low-power devices. In such a case, it may not be desirable to support the complexity associated with system-wide timing synchronization that may be used in a time division multiplex scheme. In addition, in systems such as wideband communication systems it may not be practical to restrict the frequency spectrum that the devices use for transmission. Consequently, these types of systems may experience collisions from time to time. Thus, a need exists for improved techniques for mitigating the effects of collisions in wireless communication.

SUMMARY

A summary of sample aspects of the disclosure follows. It should be understood that any reference to the term aspects herein may refer to one or more aspects of the disclosure.

The disclosure relates in some aspects to mitigating adverse effects that may occur as a result of collisions in a wireless communication system. For example, a device may be configured to define one or more values for receive data during those times that the device is transmitting. In other words, the device may not actually receive data during these times but may instead specify that any data that would be received during these times has a defined value.

Such a data value may be specified in various ways. In some cases the defined value is a predefined value (e.g., zero or some other value). In some cases the defined value is based on one or more noise levels and/or one or more signal levels in a system. For example, the defined value may be specified as a value that is above a noise floor but below a nominal signal level. In some cases the defined value may be set to an average or typical received signal value. In some cases the defined value may be a value that is weighted based on the portion of time that a received slot is blocked.

In some implementations a device may define receive data values only for the portion of a period of time during which data is expected to be received that coincides with a transmission. Thus, in this case, rather than blindly specifying a value for potential receive data during an entire transmission interval, the device may only define data for that portion of a receive data interval that actually occurs during a transmission time.

The disclosure relates in some aspects to collision mitigation in an impulse-based communication system. For example, whenever a pulse is transmitted, a device may define receive data sample values for a received pulse instead of using actual received data (e.g., samples of a received pulse).

The disclosure relates in some aspects to a hybrid on-off keying ("OOK") scheme. For example, in a pulse position modulation ("PPM") system, if one of the defined pulse positions for receive data coincides with a transmission pulse, the receive data for that pulse position may be ignored. Instead, an OOK-based test may be used for the other pulse position(s) to determine a final data value.

In some aspects, a pulse-position modulation transceiver supports at least one transmission stream while receiving at least one stream. Here, transmission and reception may collide due to, for example, clock asynchrony and/or random time-hopping. In the event collisions cannot be avoided, degradation in data reception may be mitigated through the use of the teachings herein. Thus, multiple transmissions may be accommodated during reception. The teachings herein may be applied to slicer-based transceivers (e.g., a slicer-based demodulation architecture) and other receiver technologies.

BRIEF DESCRIPTION OF THE DRAWINGS

These and other sample aspects of the disclosure will be described in the detailed description and the appended claims that follow, and in the accompanying drawings, wherein:

Figure 1:
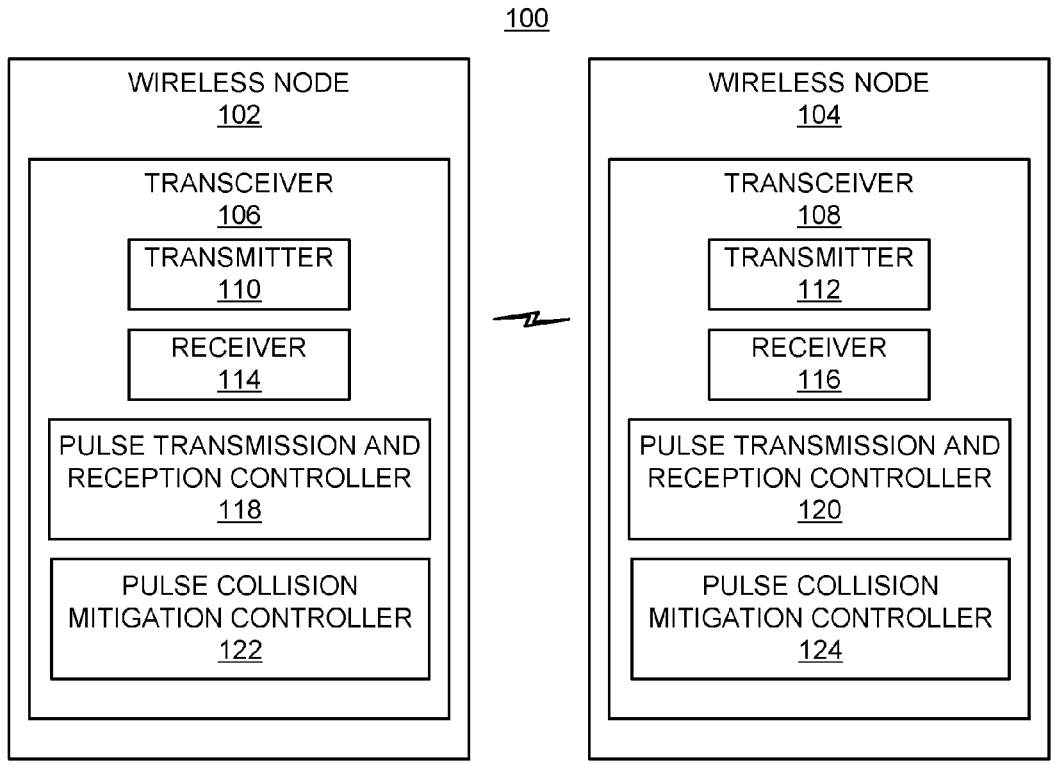
FIG. 1 is a simplified block diagram of several sample aspects of a communication system comprising two or more wireless nodes.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of wireless communication comprises: transmitting a pulse during a period of time; and specifying at least one value for data expected to be received during the period of time. In addition, in some aspects the at least one value comprises at least one predefined value.

FIG. 1 illustrates sample aspects of a communication system 100 including wireless nodes 102 and 104 (e.g., wireless devices). The nodes 102 and 104 include transceivers 106 and 108, respectively, for sending data to and receiving data from one or more nodes in the system 100. It should be appreciated that components similar to those described herein also may be incorporated into other nodes (not shown) in the system 100.

For illustration purposes, various aspects of the disclosure will be described in the context of an impulse-based communication system that employs PPM. Here, each node is configured to transmit and receive a series of PPM pulses. In some aspects, such a communication system may comprise an ultra-wideband ("UWB") system where the nodes transmit and receive UWB pulses. It should be appreciated, however, that the teachings herein may be applicable to other types of communication systems, modulation schemes, frequency bands, and signaling methods.

Figure 2:
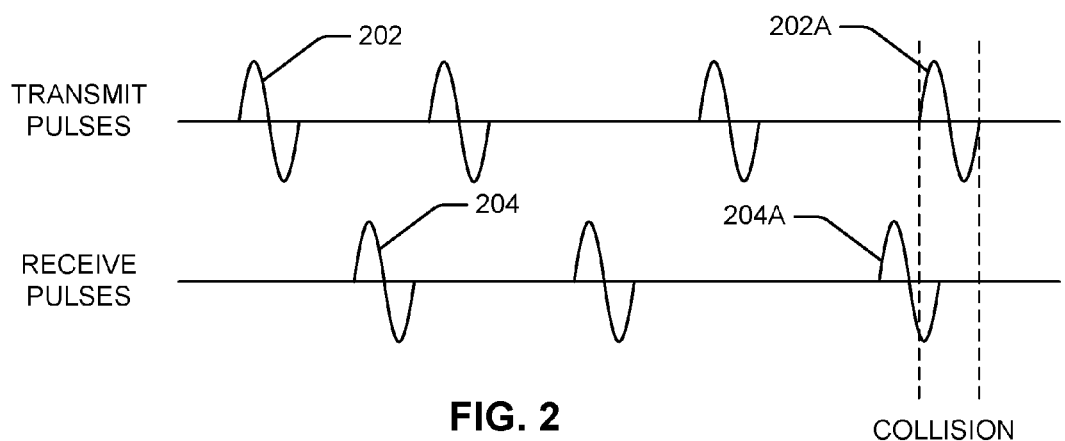
FIG. 2 is a simplified diagram of sample transmit and receive timing.

The transceivers 106 and 108 include pulse transmission and reception controllers 118 and 120, respectively, for controlling when the transmitters 110 and 112 transmit pulses and when the receivers 114 and 116 monitor for pulses. FIG. 2 illustrates, in a simplified manner, sample transmit pulses 202 and receive pulses 204 for a node (e.g., node 102). Here it may be appreciated that a given transceiver (e.g., transceiver 106) may support at least one transmission stream while receiving at least one stream. For example, a node may send a packet via a series of pulses 202 while concurrently receiving a packet via a series of pulses 204. As shown in FIG. 2, in an impulse-based system, a node may receive one or more pulses between pulse transmissions, and vice versa.

In some implementations the nodes employ a time hopping scheme to vary the times at which pulses are transmitted. Here, a set of candidate time hopping pulse positions are defined for each position of a PPM scheme. For example, in a 4-nary PPM scheme where one symbol is transmitted at a nominal rate of once every 640 ns, a transmission during a first 160 ns period may correspond to a value of "00," a transmission during a second 160 ns period may correspond to a value of "01," a transmission during a third 160 ns period may correspond to a value of "11," while a transmission during a fourth 160 ns period may correspond to a value of "10." Several (e.g., 16) time hopping pulse positions are defined for each of these PPM positions (e.g., sixteen 10 ns positions for the "00" PPM position and so on). The particular time hopping pulse position used for a given pulse transmission is then determined based on a time hopping sequence.

As represented by pulses 202A and 204A in FIG. 2, at some point in time a collision may occur whereby at least a portion of the pulse 202A is transmitted by the node during the time that the pulse 204A is received at the node. Such a collision may occur, for example, due to clock asynchrony between the nodes that transmitted the pulses 202 and 204 and/or due to random time hopping employed by the nodes that transmitted the pulses 202 and 204.

Although it may not be possible to completely resolve such collisions, the teachings herein may be employed to mitigate data errors that may be caused by these collisions. For example, the nodes 102 and 104 (e.g., the transceivers 106 and 108 as shown in FIG. 1) may include pulse collision mitigation controllers 122 and 124, respectively, that are configured to identify potential collision times (e.g., by determining when the corresponding node transmits and, optionally, receives) and adapt receive data processing operations to mitigate the effect of any potential collisions during these times.

In some aspects, transmissions are given higher priority over receptions so that whenever there is a transmission, the reception at the same time is suspended. The priority may be set in this way since the local transceiver may be fully aware of the actions it takes and may therefore more efficiently deal with the collision. In contrast, if reception was given priority, the remote transceiver may not know whether the transmissions had been tampered with (e.g., suspended by the transmitter). As a result, it may be more difficult for the remote transceiver to deal with a collision.

As will be described in more detail below, in some aspects collision mitigation may involve defining receive data values for the periods of time during which collisions may occur (e.g., as opposed to simply marking the associated receive samples as erasures, using a non-data value). Here, data expected to be received during these time periods may be set to a predefined value (e.g., zero) or to a value that is based on a noise level and/or a signal level in the system (e.g., one out of every nine receive samples is set to a "1" and the remaining samples are set to a "0"). For example, in an implementation that uses 1-bit samples, data expected to be received may be set to a value of "0" or set to a value where a certain number of samples (e.g., one sample) out of a set of samples (e.g., nine samples) are set to a "1" and the remaining samples in the set are set to a "0". In an implementation that uses 4-bit data values for each sample, for data expected to be received, all of the bits may be set to zeros or may be set based on a specific data pattern (e.g., a finite number of the samples are set to a value of "0010" and the rest of the samples are set to zero). In addition, in some cases a hybrid OOK scheme may be employed to define receive data values. Through the use of these techniques, transmission by a given node may be accommodated when another node is transmitting to that node with only a slight increase in the signal to noise ratio ("SNR") associated with reception of these transmissions. For convenience, the examples that follow may describe an implementation that uses 1-bit samples. It should be appreciated, however, that the teachings herein are applicable to other types of samples.

These and other aspects of the disclosure will now be described in more detail in conjunction with the flowchart of FIG. 3. For convenience, the operations of FIG. 3 (or any other operations discussed or taught herein) are described as being performed by components of a receive chain 400 of a transceiver as depicted in FIG. 4. It should be appreciated, however, that these operations may be performed by other types of components and receivers. In addition, a given implementation may employ a different number of components. Furthermore, one or more of the operations described herein may not be employed in a given implementation.

In some aspects the components of FIG. 4 may correspond to one or more of the transceiver components of FIG. 1. For example, the receive chain 400 may be implemented in the transceiver 106 and in the transceiver 108.

Briefly, the receive chain 400 receives signals at an antenna 402 and processes the signals to provide output data 420. Here, the signals received from the antenna 402 are initially processed by an amplifier and filter component 404. The amplifier and filter component 404 may comprise, for example, a low noise amplifier, followed by a bandpass filter, followed by a squarer, followed by low pass filter, followed by a variable gain amplifier.

The output of the amplifier and filter component 404 is provided to a sampler 406. The sampler 406 may take various forms. For example, in some implementations the sampler 406 comprises a slicer. In some implementations the sampler 406 comprises an analog-to-digital converter.

The output of the sampler 406 is provided to a receive data specifier 408. As discussed in more detail below, the receive data specifier 408 may insert defined data into the receive data stream in accordance with the teachings herein. In some cases at least some of the functionality of the receive data specifier 408 (and optionally one or more other related components) may be implemented in the sampler 406 and/or some other component.

The output of the receive data specifier 408 is provided to a demodulator 410 and a decoder 412 to provide the output data 420. For example, the decoder 412 may perform Viterbi and/or Reed-Solomon processing to provide the output data 420.

Figure 3:
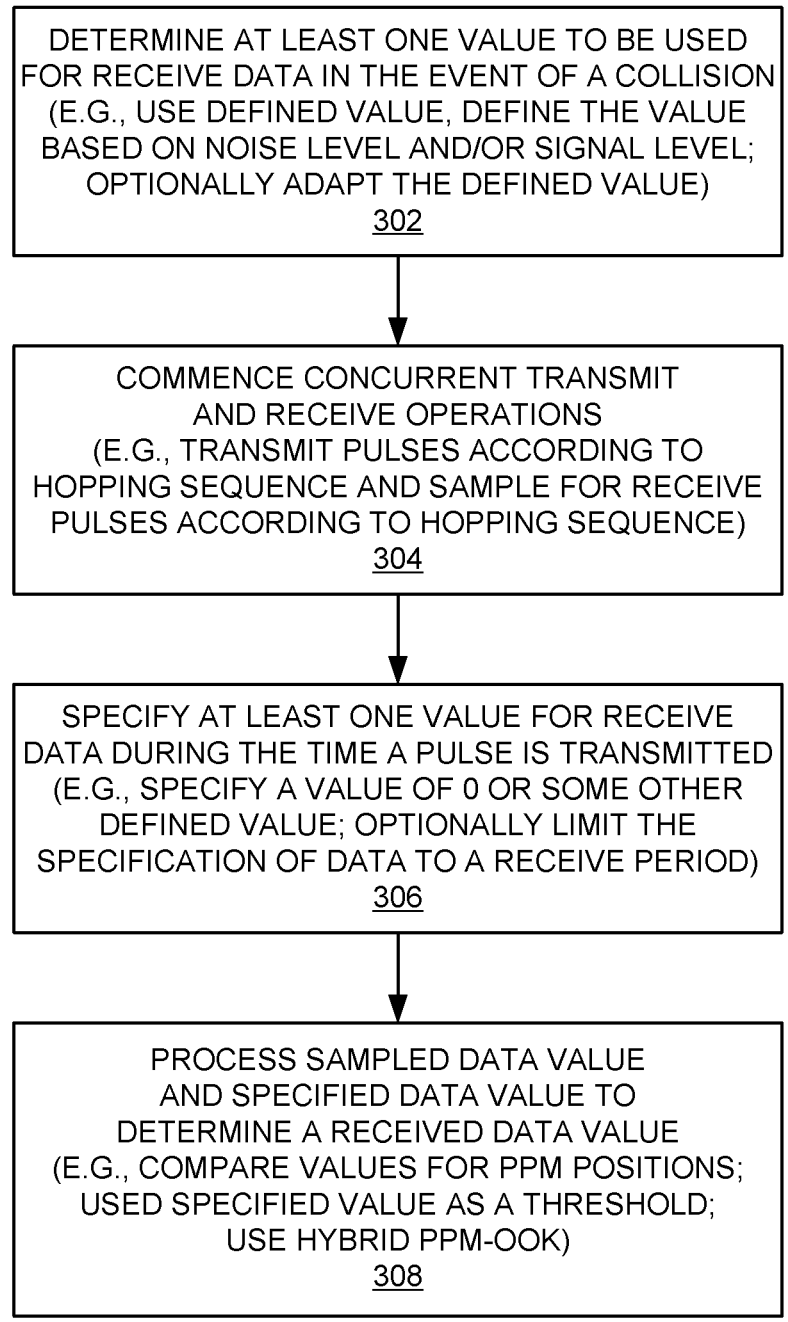
FIG. 3 is a flowchart of several sample collision mitigation operations.
Figure 4:
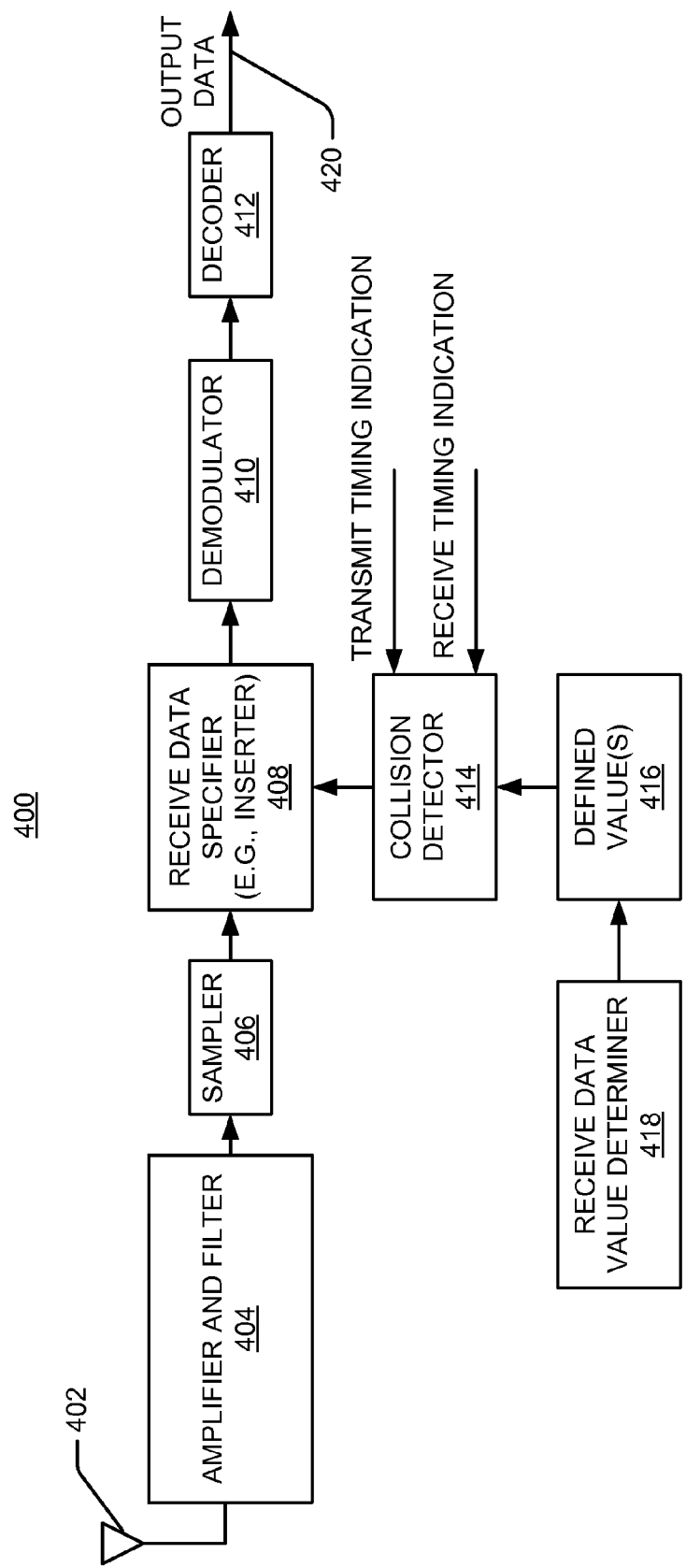
FIG. 4 is a simplified block diagram of several sample aspects of a receive chain.

Referring now to FIG. 3, as represented by block 302, at least one value that is to be used for receive data in the event of a collision (e.g., an actual or potential collision) is defined. Such a value may be defined in various ways.

In some implementations the value is (or the values are) predefined. For example, a particular value (e.g., zero) may be defined for all nodes deployed in a given system. The predefined value may be provided to each node (e.g., by operation of a receive data value determiner 418) and stored in a local memory (e.g., as represented by the defined value(s) block 416). For example, a given node may be programmed with this value or a node may receive this value from another node when the nodes associate with one another.

In some implementations one or more values are defined based on a noise and/or signal level in a system. For example, in an implementation that uses a 1-bit sampler (e.g., slicer or analog-to-digital converter), a determination may be made as to the number of samples that have, on average, a value of "1" and the number of samples that have, on average, a value of "0" in a given set of samples (e.g., one hundred samples) associated with noise in a communication system. Alternatively or additionally, a determination may be made as to the number of samples that have, on average, a value of "1" and the number of samples that have, on average, a value of "0" in a given set of samples associated with a received data signal in the communication system. Based on this determination, a set of values may be defined whereby these values may be used in place of actual received sample values. For example, when there are no transmissions on a given channel (the receive chain 400 is only receiving noise), the output of the sampler 406 may be 9% "1s" and 91% "0s." Conversely, when there is a transmission on the channel (e.g., the receive chain 400 is receiving a pulse), the output of the sampler 406 may be 20% "1s" and 80% "0s." In such a case, the defined set of values may correspond to a quantity of "1s" that falls between these values. For example, if 15% "1s" is selected, the set of values may be defined as a set of seven sample values where one of the samples has a value of "1" and the remaining samples have a value of "0."

The above determination may be made in various ways. For example, a value may be determined based on empirical data (e.g., by collecting samples over a period of time), based on an estimate, or based on some other criteria or formula. A value may be defined for all of the nodes in the system, defined for a given set of nodes (e.g. associated nodes), or defined individually for each node. In some implementations, a given node (e.g., the receive data value determiner 418) may determine the value on its own (e.g., by cooperating with the other components of the receive chain 400 to analyze received signals).

In some implementations the defined value (e.g., the number of "1"s defined for a receive slot) may be adapted over time. For example, a given value may be defined based on at least one of: current channel conditions, a result of a data error test, a measured noise level, a selected radio frequency channel, or some other condition or criterion. Such a condition may therefore be monitored over time (e.g., by conducting data error rate tests at the receiver) and, if the condition changes, the defined value may be changed as well. In a similar manner as discussed above, the value may be adapted for all of the nodes in the system, adapted for a given set of nodes, or adapted individually for each node. For example, a given node (e.g., the receive data value determiner 418) may monitor one or more conditions to adapt a value that it uses and/or that other nodes use. The adaptation of the defined value may be generalized to multi-level cases. For example, some samples (e.g., data slices) may be set to a value of "1," some samples may be set to a value of "0," and the rest may be set to a value of "−1." Here, a decision as to whether the value of "−1" is used may be adaptive. In addition, the allocation of these values (e.g., the number of samples set to a value of "1" or "0") may be adaptive.

As represented by block 304 of FIG. 3, at some point in time the node may concurrently conduct transmit and receive operations. As discussed above, a transmitter of the node may transmit pulses according to a transmit hopping sequence and the receive chain 400 may be configured to monitor for received pulses according to a receive hopping sequence. Here, in low-power applications, one or more components of the transmitter and/or the receive chain 400 may be configured in a low-power mode (e.g., turned off) when pulses are not being transmitted or when pulses are not expected to be received.

As represented by block 306, the node (e.g., the receive data specifier 408) specifies at least one value for receive data when the node is transmitting. For example, the receive data specifier 408 may insert one or more defined values into a receive data stream (e.g., by inserting a defined value or defined values into a receive buffer).

Here, the node (e.g., a collision detector 414) may determine the period of time during which the transmitter transmits a pulse and provide an indication of this time period to the receive data specifier 408. For example, as indicated in FIG. 3 the collision detector 414 may receive an indication of transmit timing from the transmitter for the node. Here, the transmission time may include the actual time of transmission as well as, in some cases, the time associated with enabling the transmitter (e.g., switching on a power amplifier) before transmitting the pulse and/or disabling the transmitter after transmitting the pulse. This entire period of time may be referred to as a turnaround time of the transceiver. In some aspects, this turnaround time may relate to any period of time during which reception may be adversely affected by transmission-related operations.

As will be described in more detail below, in some implementations the collision detector 414 may receive an indication of expected receive timing (e.g., the time period during which a receive pulse is expected according to the receive hopping sequence). Such information may be available, for example, if the receiver has acquired receive signal timing. In these implementations, the collision detector 414 may determine an overlap time period where a receive time period (e.g., corresponding to an expected receive pulse) at least partially overlaps a transmit time period (e.g., corresponding to an expected transmit pulse and, optionally, other turnaround time intervals) and provide this information to the receive data specifier 408.

Three sample schemes for handling transmission and reception collision will now be described with reference to FIGS. 5, 6, and 7. In some aspects, these schemes may be used alone or combination.

Figure 5:
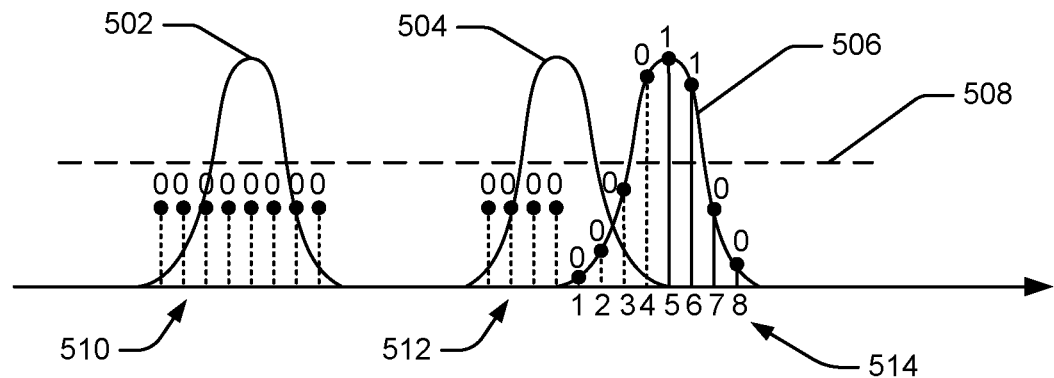
FIG. 5 is a simplified diagram illustrating a sample technique for defining one or more values for receive data.

FIG. 5 relates to a scheme where receive sample values that coincide in time with a transmission of a pulse are set to the value of "0." Two transmit pulses 502 and 504 and one receive pulse 506 are depicted in this example. The line 508 represents a threshold level for distinguishing between a "0" level and a "1" level for a 1-bit sample.

As shown in FIG. 5, in this scheme all of the samples affected by transmission pulses are marked as zeros. For example, each sample of a set of receive samples 510 that occur during the transmit pulse 502 are specified to be a value of "0." In addition, each sample of a set of receive samples 512 that occur during the transmit pulse 504 are specified to be a value of "0." Here, it may be observed that the samples 512 include the first four samples (designated sample numbers 1-4) of a set of samples 514 associated with an anticipated receive pulse 506. As sample number 4 indicates, this sample is marked as a "0" even though the signal received would be above the threshold 508 if the transmitted pulse was not present.

Figure 6:
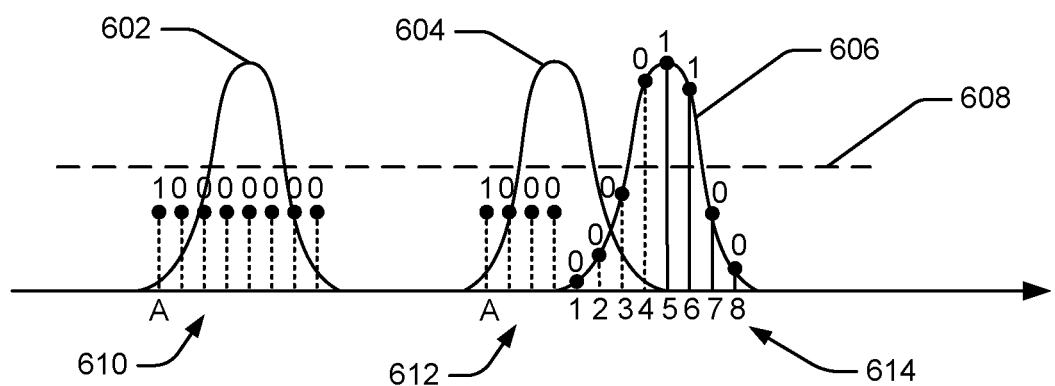
FIG. 6 is a simplified diagram illustrating a sample technique for defining one or more values for receive data.

FIG. 6 relates to a scheme where, in a set of receive sample values that correspond in time to transmission of a pulse, a certain number of samples under the transmission pulse are marked to be one and others are marked to be zero. Two transmit pulses 602 and 604 and one receive pulse 606 are depicted in this example. The line 608 represents a threshold level for distinguishing between a "0" level and a "1" level for a 1-bit sample.

As shown in FIG. 6, in this scheme one of the defined sample values is set to a value of "1" and the remaining sample values are set to a value of "0." Specifically, one sample (e.g., the first sample as marked by the "A") during each of the transmit pulses 602 and 604 is marked as a "1" while the remaining samples are marked as "0s." Again, sample number 4 illustrates that the value for a sample that occurs during a pulse transmission is set to a defined value (e.g., a predefined value). Specifically, this sample is marked as a "0" even though the signal received would be above the threshold 608 if the transmitted pulse was not present.

It should be appreciated that a different number of sample values may be set to a value of "1" in different implementations. In some cases the percentage of "1s" may be defined based on the percentage of "1s" caused by noise only and/or the percentage of "1s" caused by signal only (e.g., as discussed above). As an example of the former case, the defined data values may be selected to emulate noise on a channel.

As illustrated by FIGS. 5 and 6, the above techniques are applicable to the case where less than an entire receive pulse is affected by a transmission. During the reception of a pulse, the node may determine the number of samples affected by a transmission, if any. In the event there are any affected samples, the node may apply a defined pattern (e.g., a predefined pattern) to the missing or corrupted samples. For example, if there are three corrupted or missing samples, the node may set these samples to a value of {000}, where each "0" corresponds to one of the samples. If, on the other hand, there are four corrupted or missing samples, the node may set these samples to a value of {1000}. Thus, in some aspects, the defined value used at a given point in time may be based on the quantity of samples that are affected by a pulse transmission.

Figure 7:
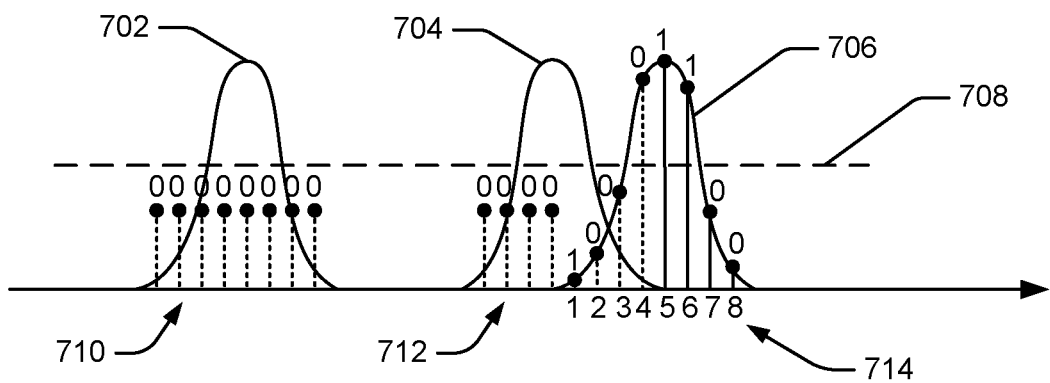
FIG. 7 is a simplified diagram illustrating a sample technique for defining one or more values for receive data.

FIG. 7 relates to a scheme where samples that correspond to a received pulse and that also correspond in time to transmission of a pulse are set to defined values. Two transmit pulses 702 and 704 and one receive pulse 706 are shown. The line 708 represents a threshold level.

In this scheme, among the samples under the received pulse 706, one or more of the samples affected by the transmit pulse 704 is marked to be a "1" and any other sample affected by the transmit pulse is marked to be a "0." For example, among sample numbers 1 to 4 (associated with the expected receive pulse 706) that are affected by the transmit pulse 704 in FIG. 7, one quarter of these samples (e.g., sample number 1) is marked as a "1" and each of the other samples is marked as a "0." Again, it should be appreciated that other defined values (e.g., a different number of "1s") may be used in different cases.

Also, in the scheme of FIG. 7, any samples that do not occur during an expected receive pulse may be ignored or set to a defined value. As an example of the latter case, as shown in FIG. 7, each sample of the set of samples 710 and the first four samples of sample set 712 may be set to a "0."

One difference between the schemes of FIGS. 6 and 7 is that the scheme of FIG. 6 is transmission-centric, where each transmission pulse marks its own samples regardless of any other pulse. Conversely, the scheme of FIG. 7 is reception-centric, where only the samples under a received pulse are considered.

The three schemes described above may provide complexity and performance trade-off. In some aspects, the scheme of FIG. 5 may be the simplest. Thus, such a scheme may be particularly suited for acquisition where the receive pulse position is unknown. The scheme of FIG. 7 may provide better performance. Thus, in some aspects this scheme may be used for data demodulation after timing is acquired.

Advantageously, the proposed schemes may be easy to integrate in existing transceiver designs. Such schemes may thus be employed to handle multiple transmission streams with minimal complexity (e.g., the scheme of FIG. 5) to more moderate complexity (e.g., the scheme of FIG. 7). For example, when a transceiver receives one or more streams, the teachings described herein may be used to concurrently support one, two, three or more transmission streams.

Referring again to FIG. 3, as represented by block 308, the node (e.g., the demodulator 410 and the decoder 412) process the receive data stream to determine the receive data values (e.g., output data 420). In some aspects, this may involve processing specified data values as provided at block 306 along with actual sampled data values provided by the sampler 406. For example, in FIG. 5 each of the values associated with samples number 1-8 may be taken into consideration to determine whether a value of "1" or "0" has been received at pulse 506. This may involve, for example, the decoder 412 comparing the magnitude of the samples associated with pulse 506 (e.g., corresponding to the "0" PPM pulse position) with the magnitude of any samples acquired at another time (e.g., corresponding to the "1" PPM pulse position). Thus, in some cases the decoder 412 may determine at least one value associated with one PPM position based, at least in part, on at least one defined receive data value. In addition, the decoder 412 may determine at least one other value associated with another PPM position based on one or more sample values. The decoder 412 may then determine a PPM data value based on the values associated with these PPM positions (e.g., by comparing a value for one PPM position with a value for the other PPM position).

In some aspects, the specified data values may correspond to a threshold that is used to determine the value for a given PPM pulse. This may be the case, for example, in the event the defined values correspond to a set of sample values have an overall value that is greater than a typical noise level but below a nominal (e.g., typical) signal level. Here, defined data values corresponding to one PPM pulse position (optionally combined with other actual sample values for that PPM pulse position) may serve as a threshold to be compared with the sample values acquired for another PPM pulse position.

Thus, in some aspects specified data values may be used as a threshold in conjunction with a hybrid OOK scheme. For example, if it is determined that the samples associated with a given PPM pulse position are unreliable, the decoder 412 may employ an OOK-based test that uses the threshold on another PPM pulse position to determine a final output data value for the PPM pulse.

Figure 8:
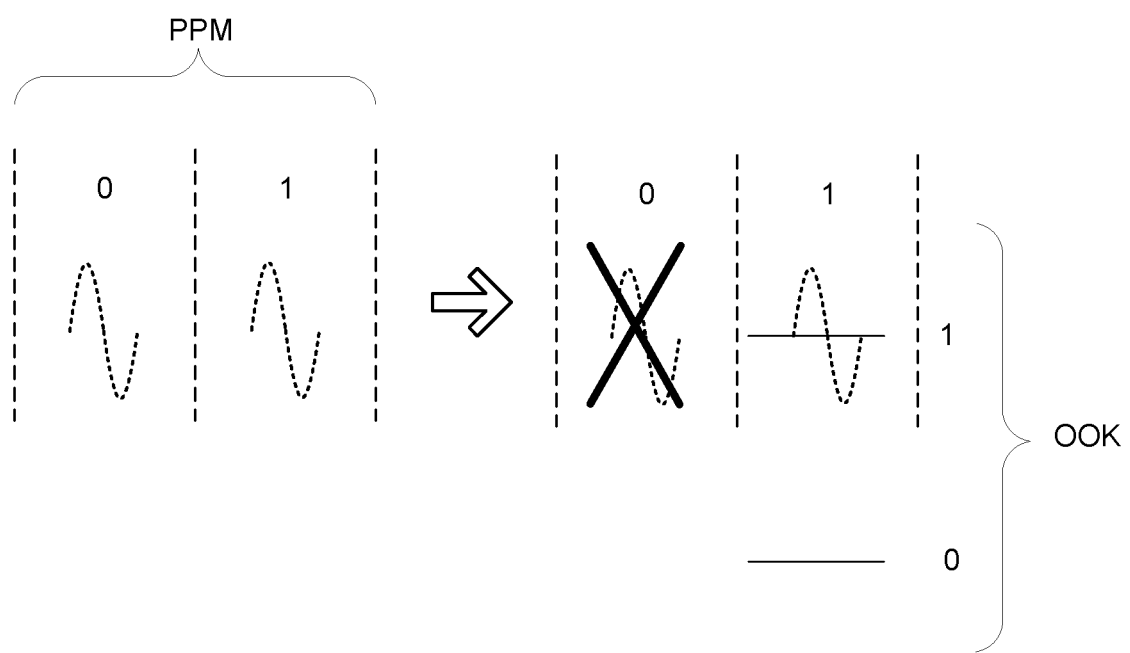
FIG. 8 is a simplified diagram describing a sample hybrid PPM-OOK operation.

For illustrations purposes, FIG. 8 depicts how a hybrid OOK scheme may be employed for the case of binary PPM. It should be appreciated that a hybrid OOK scheme also may be employed in other n-ary PPM schemes as well as in other modulation schemes.

The left-hand side of FIG. 8 illustrates that two positions are defined for a binary PPM signal. In this example, if a pulse appears in the first pulse position but not in the second pulse position, a value of "0" is indicated. Conversely, if a pulse appears in the second pulse position but not in the first pulse position, a value of "1" is indicated.

The right-hand side of FIG. 8 illustrates that if the signal information associated with one of the PPM positions (the "0" PPM position in this example) is corrupted, an output data value may still be determined by applying an OOK-based test to the other PPM position (the "1" PPM position in this example). For example, if the presence of a signal is detected in the "1" PPM position (e.g., based on a comparison of the sampled signal with a threshold), a value of "1" is indicated for the output data.

Conversely, if the presence of a signal is not detected in the "1" PPM position, a value of "0" is indicated for the data. In other words, the node (e.g., the receive data specifier 408) may estimate the value of the "0" PPM position (e.g., the presence of a pulse in this position) based on the value of the "1" PPM position (i.e., the absence of a pulse). The node (e.g., the decoder 412) may then set the indicated value for the PPM data to this estimated value (i.e., "0").

Sample hybrid OOK operations will now be described in more detail in conjunction with FIG. 9. In this example, a decision by a node to use a hybrid OOK scheme (e.g., a hybrid OOK trigger condition) is based on whether a potential or actual collision condition exists. It should be appreciated, however, that a hybrid OOK operation may be triggered based on other criteria (e.g., a determination that received signal information is unavailable or unreliable for some other reason).

Figure 9:
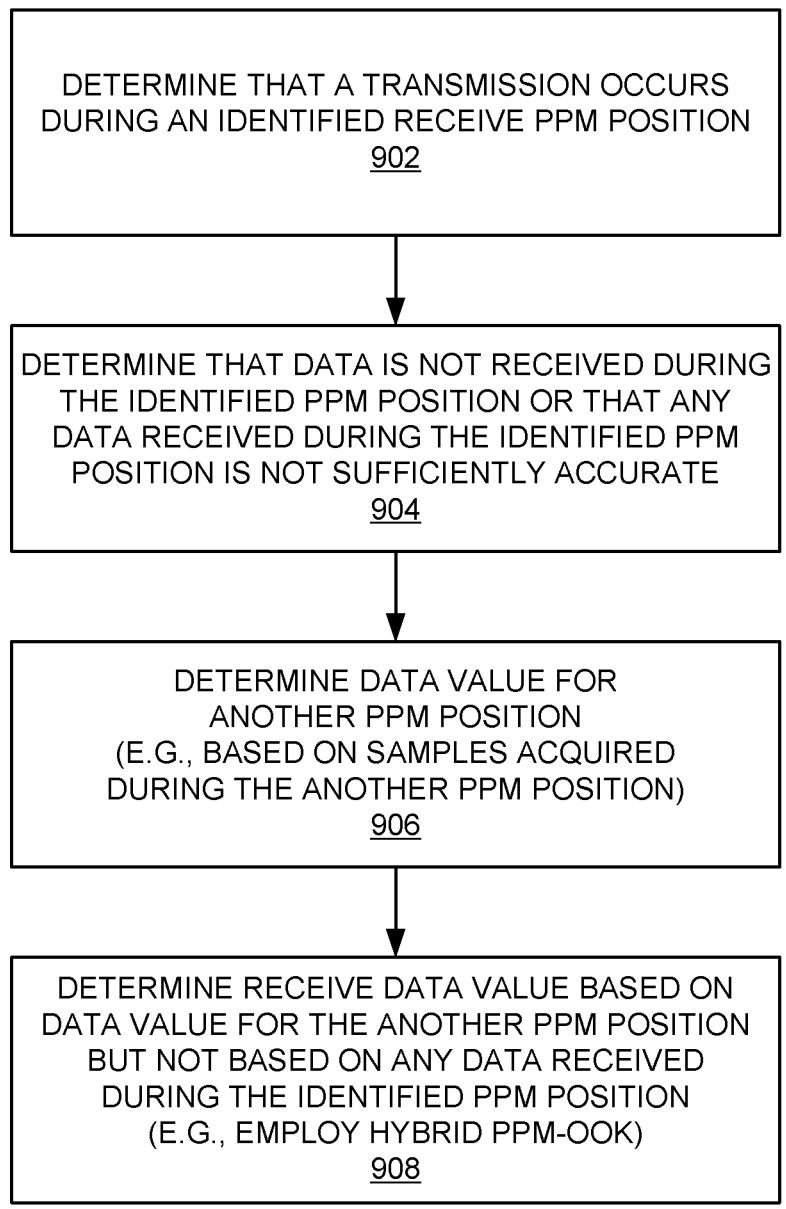
FIG. 9 is a flowchart of several sample operations relating to hybrid PPM-OOK.

As represented by block 902 of FIG. 9, at some point in time a node (e.g., the collision detector 414) determines that a transmission occurs during a given receive PPM position (e.g., the "0" PPM position of FIG. 8). For example, as mentioned above, the collision detector 414 may receive information indicative of the timing of pulse transmissions from a transmitter and the expected timing of received pulses. In some aspects this information may be based on a time hopping sequence.

As represented by block 904, the node (e.g., the decoder 412) may elect to not use received data associated with the identified PPM position. In some cases, the decoder 412 may determine that data was not received during the identified PPM position. For example, the receiver may be turned off when a pulse is being transmitted. Alternatively, the decoder 412 may determine that any data received during this PPM position is not sufficiently accurate. For example, it may be assumed that the received data is corrupted as a result of the collision with the transmitted pulse.

As represented by block 906, the node determines a data value for another PPM position. For example, the sampler 406 may obtain sample values corresponding to the "1" PPM position of FIG. 8.

As represented by block 908, in some cases the node (e.g., the decoder 412) may determine a final receive data value based on the data value associated with one PPM position (e.g., as obtained at block 906) but not based on any data received during another PPM position (e.g., the "0" PPM position of FIG. 8). For example, the data value obtained at block 906 may be compared with a defined data value or a threshold (e.g., which may be based on the defined data value in some cases) to determine whether a valid signal was received during the "1" PPM position of FIG. 8. As an example, the techniques described above in conjunction with FIG. 3 may be employed to provide one or more defined data values for data that was expected to be received when a pulse was transmitted. In this case, the samples acquired at block 906 may be compared with the defined data value(s) to determine whether a valid signal was received during the "1" PPM position. For example, if the number of acquired samples that have a value of "1" exceeds the number of defined data sample values that have a value of "1," the decoder 412 may deem that a pulse was received in the "1" PPM position.

A specific example of transitioning between PPM and OOK follows. Assume that a certain percentage (x %) of a slot is occluded by a transmission outage. On the receive side, energy is accumulated (e.g., either analog-to-digital converter bits or actual charge) for the occluded area based on a predetermined level, and over the non-occluded area at the actual receive level. Here, the predetermined level may be an average typical received signal level, a threshold level, an average noise level, a scaling of the average noise level, or some other suitable value. For a case of binary PPM, if x % is 100% in a first one of the two slots, the process effectively becomes an OOK operation for the second slot. If x % is 0% in both slots, the process is PPM. If x % is between 0% and 100%, the process may involve a weighted average between PPM and OOK.

As mentioned above, the hybrid OOK scheme may be employed with other n-ary PPM schemes. In such a case, the node (e.g., the decoder 412) may compute the number of "1" sample values associated with each PPM position (e.g., including the samples values associated with a PPM position for which received data was defined). The node (e.g., the decoder 412) may then determine which PPM position has the greater number of "1" sample values to determine (e.g., estimate) which PPM position had a pulse.

In some aspects the criteria for switching from normal PPM operations to hybrid OOK operations may be dynamic. For example, if fewer than a specified number of samples (e.g., four samples) are affected by a transmission, the node (e.g., the decoder 412) may elect to continue to use PPM (e.g., in conjunction with defining receive data values as taught herein). Conversely, if the specified number of samples (or more than the specified number of samples) is affected by a transmission, the node may elect to switch to hybrid OOK.

Figure 10:
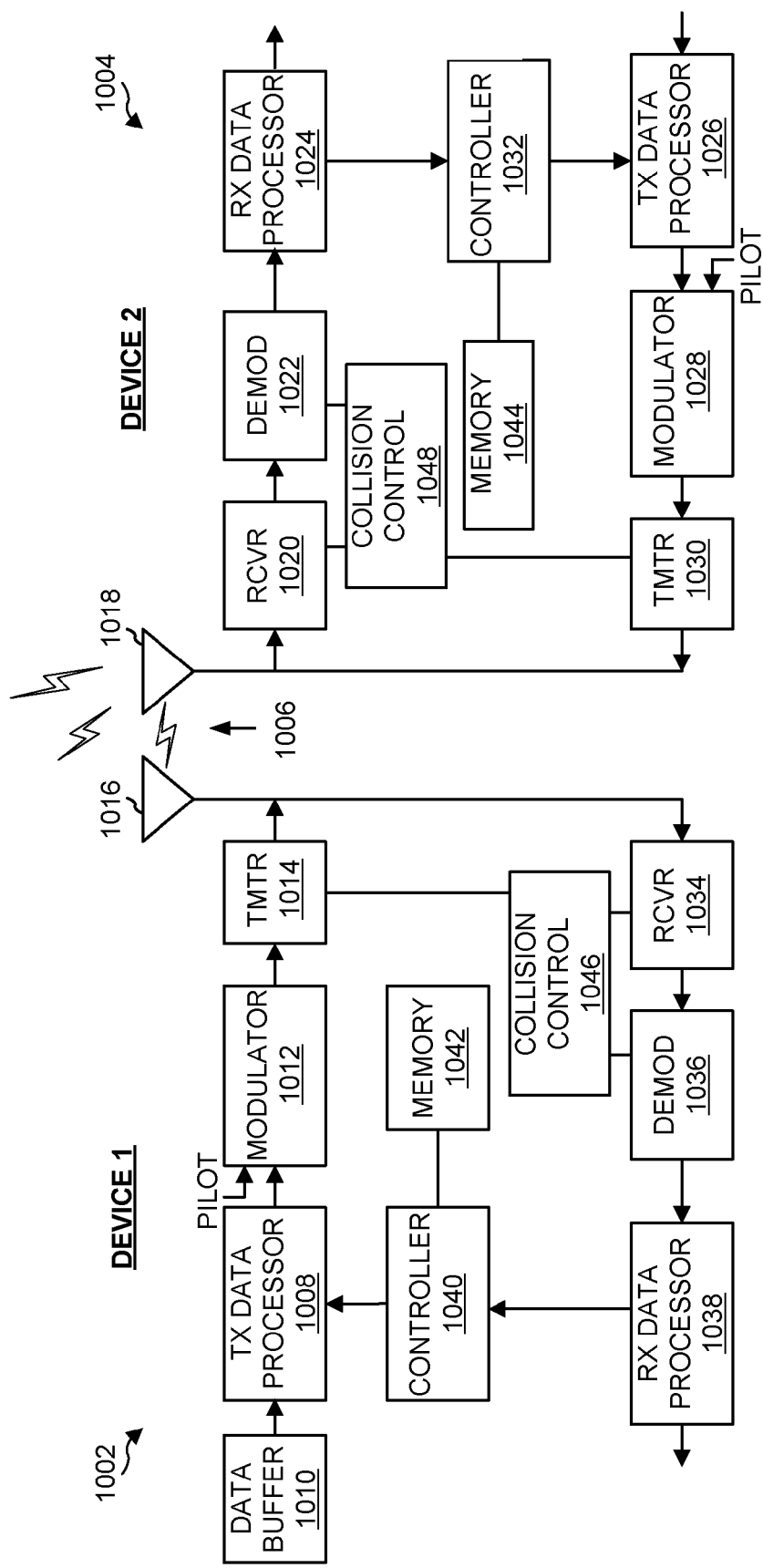
FIG. 10 is a simplified block diagram of several sample aspects of communication components.

The teachings herein may be incorporated into a device employing various components for communicating with at least one other device. FIG. 10 depicts several sample components that may be employed to facilitate communication between devices. Here, a first device 1002 and a second device 1004 are adapted to communicate via a wireless communication link 1006 over a suitable medium.

Initially, components involved in sending information from the device 1002 to the device 1004 (e.g., a reverse link) will be treated. A transmit ("TX") data processor 1008 receives traffic data (e.g., data packets) from a data buffer 1010 or some other suitable component. The transmit data processor 1008 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1012 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1014 processes (e.g., converts to analog, filters, amplifies, and frequency upconverts) the output chip stream and generates a modulated signal, which is then transmitted from an antenna 1016.

The modulated signals transmitted by the device 1002 (along with signals from other devices in communication with the device 1004) are received by an antenna 1018 of the device 1004. A receiver ("RCVR") 1020 processes (e.g., conditions and digitizes) the received signal from the antenna 1018 and provides received samples. A demodulator ("DEMOD") 1022 processes (e.g., demodulates and detects) the received samples and provides detected data symbols, which may be a noisy estimate of the data symbols transmitted to the device 1004 by the other device(s). A receive ("RX") data processor 1024 processes (e.g., symbol demaps, deinterleaves, and decodes) the detected data symbols and provides decoded data associated with each transmitting device (e.g., device 1002).

Components involved in sending information from the device 1004 to the device 1002 (e.g., a forward link) will be now be treated. At the device 1004, traffic data is processed by a transmit ("TX") data processor 1026 to generate data symbols. A modulator 1028 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1030 and transmitted from the antenna 1018. In some implementations signaling for the forward link may include power control commands and other information (e.g., relating to a communication channel) generated by a controller 1032 for all devices (e.g. terminals) transmitting on the reverse link to the device 1004.

At the device 1002, the modulated signal transmitted by the device 1004 is received by the antenna 1016, conditioned and digitized by a receiver ("RCVR") 1034, and processed by a demodulator ("DEMOD") 1036 to obtain detected data symbols. A receive ("RX") data processor 1038 processes the detected data symbols and provides decoded data for the device 1002 and the forward link signaling. A controller 1040 receives power control commands and other information to control data transmission and to control transmit power on the reverse link to the device 1004.

The controllers 1040 and 1032 direct various operations of the device 1002 and the device 1004, respectively. For example, a controller may determine an appropriate filter, reporting information about the filter, and decode information using a filter. Data memories 1042 and 1044 may store program codes and data used by the controllers 1040 and 1032, respectively.

FIG. 10 also illustrates that the communication components may include one or more components that perform collision-related operations as taught herein. For example, a collision control component 1046 may cooperate with the controller 1040 and/or other components of the device 1002 to receive information from another device (e.g., device 1004). Similarly, a collision control component 1048 may cooperate with the controller 1032 and/or other components of the device 1004 to receive information from another device (e.g., device 1002). It should be appreciated that for each device 1002 and 1004 the functionality of two or more of the described components may be provided by a single component. For example, a single processing component may provide the functionality of the collision control component 1046 and the controller 1040 and a single processing component may provide the functionality of the collision control component 1048 and the controller 1032.

A wireless device may include various components that perform functions based on signals (e.g., pulses) that are transmitted by or received at the wireless device. For example, a wireless headset may include a transducer adapted to provide an audio output based on a specified and/or determined value. A wireless watch may include a user interface adapted to provide an indication based on a specified and/or determined value. A wireless sensing device may include a sensor adapted to provide data for transmission via one or more pulses.

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 110 and receiver 114) that may include various components (e.g., signal generators and signal processors) that facilitate communication over a wireless medium.

In some aspects a wireless device may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

Figure 11:
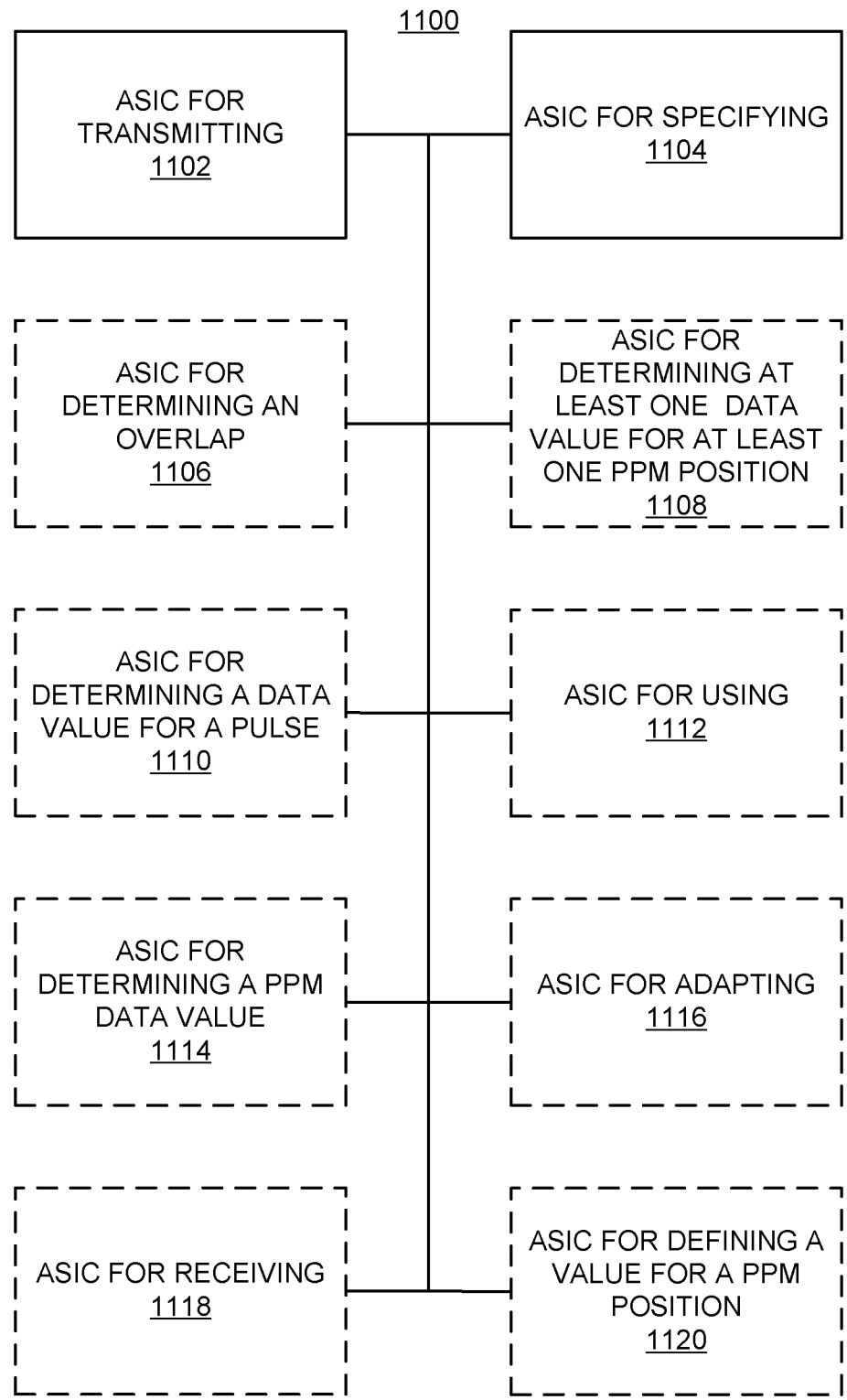
FIGS. 11 and 12 are simplified block diagrams of several sample aspects of apparatuses configured to determine receive data values as taught herein.
Figure 12:
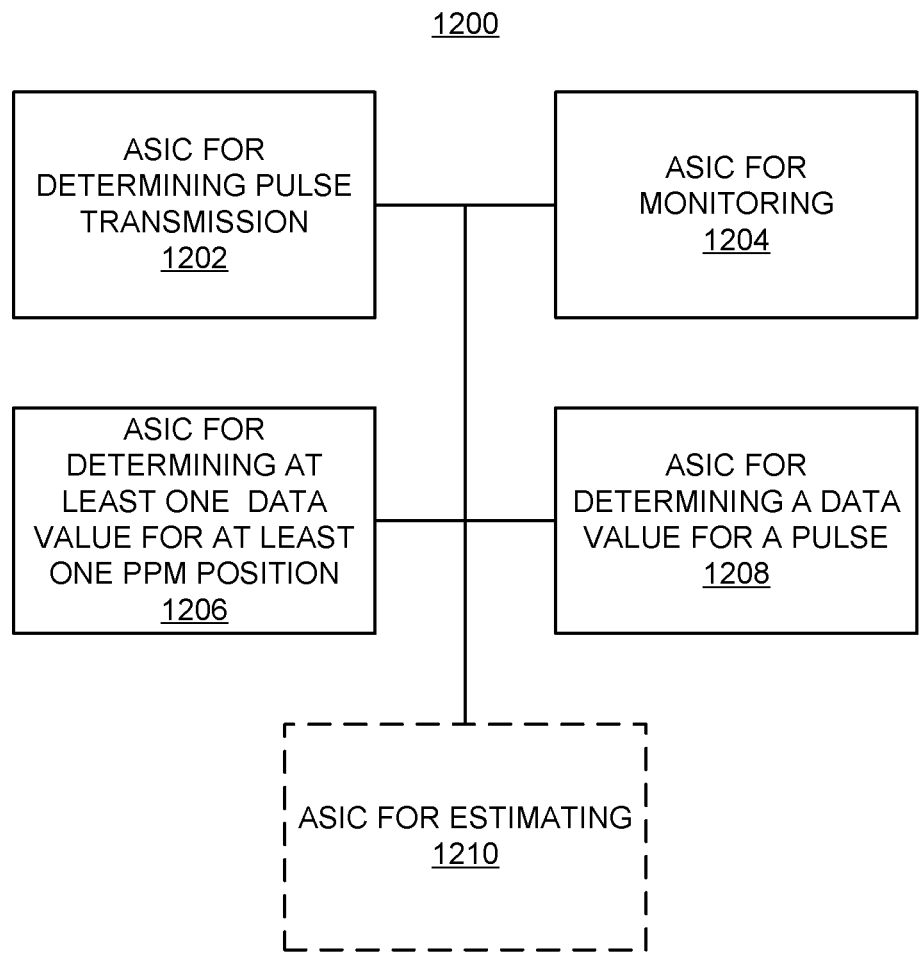

The components described herein may be implemented in a variety of ways. Referring to FIGS. 11 and 12, apparatuses 1100 and 1200 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof The apparatuses 1100 and 1200 may include one or more modules that may perform one or more of the functions described above with regard to various figures. For example, an ASIC for transmitting 1102 may correspond to, for example, a transmitter as discussed herein. An ASIC for specifying 1104 may correspond to, for example, a receive data specifier as discussed herein. An ASIC for determining an overlap 1106 may correspond to, for example, a collision detector as discussed herein. An ASIC for determining at least one data value for at least one PPM position 1108 may correspond to, for example, a sampler as discussed herein. An ASIC for determining a data value for a pulse 1110 may correspond to, for example, a decoder as discussed herein. An ASIC for using 1112 may correspond to, for example, a decoder as discussed herein. An ASIC for determining a PPM data value 1114 may correspond to, for example, a decoder as discussed herein. An ASIC for adapting 1116 may correspond to, for example, a data value determiner as discussed herein. An ASIC for receiving 1118 may correspond to, for example, a receiver as discussed herein. An ASIC for defining a value for a PPM position 1120 may correspond to, for example, a decoder as discussed herein. An ASIC for determining pulse transmission 1202 may correspond to, for example, a collision detector as discussed herein. An ASIC for monitoring 1204 may correspond to, for example, a receiver as discussed herein. An ASIC for determining at least one data value for at least one PPM position 1206 may correspond to, for example, a sampler as discussed herein. An ASIC for determining a data value for a pulse 1208 may correspond to, for example, a decoder as discussed herein. An ASIC for estimating 1210 may correspond to, for example, a receive data specifier as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 1100 and 1200 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 11 and 12 as well as other components and functions described herein, may be implemented using any suitable means. Such means also may be implemented, at least in part, using corresponding structure as taught herein. For example, the components described above in conjunction with the "ASIC for" components of FIGS. 11 and 12 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., encoded with codes executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
    transmitting, by a node, a transmitted pulse during a period of time;
    sampling, by the node, a first portion of a received pulse and a second portion of the received pulse occurring during the period of time; and
    substituting, by the node, at least one value representing the second portion of the received pulse for at least one sampled value of the second portion of the received pulse, wherein the transmitted pulse and the received pulse at least partially overlap each other in time.

2. The method of claim 1, wherein the at least one value comprises at least one predefined value.

3. The method of claim 1, wherein the at least one value comprises a plurality of values and each value of the plurality of values is defined to be zero.

4. The method of claim 1, wherein the at least one value is defined based on at least one of: a noise level or a signal level.

5. The method of claim 1, wherein:
    the at least one value comprises a plurality of values;
    the plurality of values corresponds to data samples; and
    at least one member of the plurality of values is defined to be a first value and each remaining member of the plurality of values is defined to be a second value.

6. The method of claim 5, wherein:
    the at least one member of the plurality of values comprises a plurality of members;
    the plurality of members comprises a defined quantity of members; and
    the defined quantity is based on at least one of: a noise level or a signal level.

7. The method of claim 1, wherein:
    the received pulse is expected to be received during a receive time period;
    the method further comprises determining an overlap time period where the receive time period overlaps with the period of time; and the at least one sampled value of the second portion of the received pulse for which the at least one value is substituted occurs during the overlap time period.

8. The method of claim 7, wherein:
the at least one value that is substituted comprises a plurality of values that corresponds to data samples of the second portion of the received pulse; and
at least one member of the plurality of values is defined to be a first value and each remaining member of the plurality of values is defined to be a second value.

9. The method of claim 8, wherein:
the at least one member of the plurality of values comprises a defined quantity of members; and
the defined quantity is based on at least one of: a noise level or a signal level.

10. The method of claim 1, wherein the period of time overlaps at least one position of a plurality of pulse position modulation (PPM) positions defined for receiving another pulse, the method further comprising:
determining at least one other data value for at least another one of the PPM positions; and
determining a data value for the another pulse based on the at least one other data value but not based on the at least one sampled value of the second portion of the received pulse.

11. The method of claim 10, wherein the determination of the data value for the another pulse comprises an on-off keying operation.

12. The method of claim 10, wherein the determination of the data value for the another pulse comprises setting the data value for the another pulse equal to the at least one other data value.

13. The method of claim 10, further comprising determining the at least one value by estimating a data value for the at least one position based on the at least one other data value, wherein the determination of the data value for the another pulse comprises setting the data value for the another pulse equal to the estimated data value.

14. The method of claim 10, further comprising triggering the determining of the data value for the another pulse based on determining that the at least one sampled value of the second portion of the received pulse is not available or is not sufficiently accurate.

15. The method of claim 1, further comprising using the at least one value to provide a decision threshold for determining a received data value.

16. The method of claim 1, wherein the period of time overlaps at least one of a plurality of pulse position modulation (PPM) positions for receive data, the method further comprising:
determining at least one determined value based on the at least one value;
generating at least one second sampled value by sampling during at least another one of the PPM positions; and
determining a PPM data value based on the at least one determined value and the at least one second sampled value.

17. The method of claim 1, further comprising:
determining a quantity of samples affected by the transmitting of the transmitted pulse; and
defining the at least one value based on the determined quantity.

18. The method of claim 1, wherein the at least one value comprises at least one defined value, the method further comprising adapting the at least one defined value.

19. The method of claim 18, wherein the at least one defined value is adapted based on at least one of: a measured noise level, a selected radio frequency channel, or a result of a data error test.

20. The method of claim 1 further comprising determining a symbol value represented by the received pulse based on samples of the first portion of the received pulse and the at least one substituted value.

21. An apparatus for wireless communication, comprising:
a transmitter configured to transmit a transmitted pulse during a period of time; and
a receiver configured to sample a first portion of a received pulse and a second portion of the received pulse occurring during the period of time, the receiver comprises a receive data specifier configured to substitute at least one value representing the second portion of the received pulse for at least one sampled value of the second portion of the received pulse, wherein the transmitted pulse and the received pulse at least partially overlap each other in time.

22. The apparatus of claim 21, wherein the at least one value comprises at least one predefined value.

23. The apparatus of claim 21, wherein the at least one value comprises a plurality of values and each value of the plurality of values is defined to be zero.

24. The apparatus of claim 21, wherein the at least one value is defined based on at least one of: a noise level or a signal level.

25. The apparatus of claim 21, wherein:
the at least one value comprises a plurality of values;
the plurality of values corresponds to data samples; and
at least one member of the plurality of values is defined to be a first value and each remaining member of the plurality of values is defined to be a second value.

26. The apparatus of claim 25, wherein:
the at least one member of the plurality of values comprises a plurality of members;
the plurality of members comprises a defined quantity of members; and
the defined quantity is based on at least one of: a noise level or a signal level.

27. The apparatus of claim 21, wherein:
the received pulse is expected to be received by the receiver during a receive time period;
the receiver further comprises a collision detector in communication with the transmitter, the collision detector configured to determine an overlap time period where the receive time period overlaps with the period of time; and
the at least one sampled value of the second portion of the received pulse for which the at least one value is substituted occurs during the overlap time period.

28. The apparatus of claim 27, wherein:
the at least one value that is substituted comprises a plurality of values that correspond to data samples of the second portion of the received pulse; and
at least one member of the plurality of values is defined to be a first value and each remaining member of the plurality of values is defined to be a second value.

29. The apparatus of claim 28, wherein:
the at least one member of the plurality of values comprises a defined quantity of members; and
the defined quantity is based on at least one of: a noise level or a signal level.

30. The apparatus of claim 21, wherein the period of time overlaps at least one position of a plurality of pulse position modulation (PPM) positions defined for receiving another pulse, the receiver further comprises:
- a sampler configured to determine at least one other data value for at least another one of the PPM positions; and
- a decoder configured to determine a data value for the another pulse based on the at least one other data value determined by the sampler but not based on the at least one sampled value of the second portion of the received pulse.

31. The apparatus of claim 30, wherein the determination of the data value for the another pulse comprises an on-off keying operation.

32. The apparatus of claim 30, wherein the determination of the data value for the another pulse comprises setting the data value for the another pulse equal to the at least one other data value.

33. The apparatus of claim 30, wherein:
- the receive data specifier is further configured to determine the at least one value by estimating a data value for the at least one position based on the at least one other data value; and
- the determination of the data value for the another pulse comprises setting the data value for the another pulse equal to the estimated data value.

34. The apparatus of claim 30, wherein the decoder is further configured to trigger the determining of the data value for the another pulse based on determining that the at least one sampled value of the second portion of the received pulse is not available or is not sufficiently accurate.

35. The apparatus of claim 21, wherein the receiver further comprises a decoder configured to use the at least one value substituted by the receive data specifier to provide a decision threshold for determining a received data value.

36. The apparatus of claim 21, wherein:
- the period of time overlaps at least one of a plurality of pulse position modulation (PPM) positions for receive data;
- the receiver further comprises a decoder configured to determine at least one determined value based on the at least one value substituted by the receive data specifier;
- the receiver further comprises a sampler configured to generate at least one second sampled value by sampling during at least another one of the PPM positions; and
- the decoder is further configured to determine a PPM data value based on the at least one determined value determined by the decoder and the at least one second sampled value sampled by the sampler.

37. The apparatus of claim 21, wherein the receive data specifier is further configured to:
- determine a quantity of samples affected by the transmitting of the transmitted pulse; and
- define the at least one value based on the determined quantity.

38. The apparatus of claim 21, wherein:
- the at least one value comprises at least one defined value; and
- the receiver further comprises a data value determiner configured to adapt the at least one defined value.

39. The apparatus of claim 38, wherein the at least one defined value is adapted based on at least one of: a measured noise level, a selected radio frequency channel, or a result of a data error test.

40. An apparatus for wireless communication, comprising:
- means for transmitting a transmitted pulse during a period of time; and
- a receiver configured to sample a first portion of a received pulse and a second portion of the received pulse occurring during the period of time, the receiver comprises specifier means for substituting at least one value representing the second portion of the received pulse for at least one sampled value of the second portion of the received pulse, wherein the transmitted pulse and the received pulse at least partially overlap each other in time.

41. The apparatus of claim 40, wherein the at least one value comprises at least one predefined value.

42. The apparatus of claim 40, wherein the at least one value comprises a plurality of values and each value of the plurality of values is defined to be zero.

43. The apparatus of claim 40, wherein the at least one value is defined based on at least one of: a noise level or a signal level.

44. The apparatus of claim 40, wherein:
- the at least one value comprises a plurality of values;
- the plurality of values corresponds to data samples; and
- at least one member of the plurality of values is defined to be a first value and each remaining member of the plurality of values is defined to be a second value.

45. The apparatus of claim 44, wherein:
- the at least one member of the plurality of values comprises a plurality of members;
- the plurality of members comprises a defined quantity of members; and
- the defined quantity is based on at least one of: a noise level or a signal level.

46. The apparatus of claim 40, wherein:
- the received pulse is expected to be received by the receiver during a receive time period;
- the receiver further comprises collision detection means for determining an overlap time period where the receive time period overlaps with the period of time in communication with the means for transmitting; and
- the at least one sampled value of the second portion of the received pulse for which the at least one value is substituted occurs during the overlap time period.

47. The apparatus of claim 46, wherein:
- the at least one value that is substituted comprises a plurality of values that corresponds to data samples of the second portion of the received pulse; and
- at least one member of the plurality of values is defined to be a first value and each remaining member of the plurality of values is defined to be a second value.

48. The apparatus of claim 47, wherein:
- the at least one member of the plurality of values comprises a defined quantity of members; and
- the defined quantity is based on at least one of: a noise level or a signal level.

49. The apparatus of claim 40, wherein the period of time overlaps at least one position of a plurality of pulse position modulation (PPM) positions defined for receiving another pulse, the receiver further comprises:
- sampler means for determining at least one other data value for at least another one of the PPM positions; and
- decoder means for determining a data value for the another pulse based on the at least one other data value, determined by the sampler means, but not based on the at least one sampled value of the second portion of the received pulse.

50. The apparatus of claim 49, wherein the determination of the data value for the another pulse comprises an on-off keying operation.

51. The apparatus of claim 49, wherein the determination of the data value for the another pulse comprises setting the data value for the another pulse equal to the at least one other data value.

52. The apparatus of claim 49, wherein:
the specifier means is configured to determine the at least one value by estimating a data value for the at least one position based on the at least one other data value; and
the determination of the data value for the another pulse comprises setting the data value for the another pulse equal to the estimated data value.

53. The apparatus of claim 49, wherein the decoder means is configured to trigger the determining of the data value for the another pulse based on determining that the at least one sampled value of the second portion of the received pulse is not available or is not sufficiently accurate.

54. The apparatus of claim 40, wherein the receiver further comprises decoder means for using the at least one value, substituted by the specifier means, to provide a decision threshold for determining a received data value.

55. The apparatus of claim 40, wherein:
the period of time overlaps at least one of a plurality of pulse position modulation (PPM) positions for receive data;
the receiver further comprises decoder means for determining at least one determined value based on the at least one value substituted by the specifier means;
the receiver further comprises sampler means for generating at least one second sampled value by sampling during at least another one of the PPM positions; and
the receiver further comprises means for determining a PPM data value based on the at least one determined value determined by the decoder means and the at least one second sampled value sampled by the sampler means.

56. The apparatus of claim 40, wherein the specifier means is configured to:
determine a quantity of samples affected by the transmitting of the transmitted pulse; and
define the at least one value based on the determined quantity.

57. The apparatus of claim 40, wherein the at least one value comprises at least one defined value, the receiver further comprises data value determiner means in communication with the receiver for adapting the at least one defined value.

58. The apparatus of claim 57, wherein the at least one defined value is adapted based on at least one of: a measured noise level, a selected radio frequency channel, or a result of a data error test.

59. The apparatus of claim 40, wherein a first portion of a pulse position modulation (PPM) position associated with data expected to be received overlaps the period of time and a second portion of the PPM position does not overlap the period of time, the receiver being configured to receive data during the second portion of the PPM position and the receiver further comprises:
decoder means for defining a value for the PPM position based on the data received by the receiver and the at least one value specified by the specifier means.

60. A computer-program product for wireless communication, comprising:
a non-transitory computer-readable medium encoded with codes executable by a processor to:
transmit a transmitted pulse during a period of time;
sample a first portion of a received pulse and a second portion of the received pulse occurring during the period of time; and
substitute at least one value representing the second portion of the received pulse for at least one sampled value of the second portion of the received pulse, wherein the transmitted pulse and the received pulse at least partially overlap each other in time.

61. A method of wireless communication, comprising:
determining that transmission of a first pulse by a node occurs during a first position of a plurality of pulse position modulation (PPM) positions defined for receiving a second pulse at the node;
monitoring for the second pulse during a second position of the PPM positions;
determining at least one data value for the second position of the PPM positions based on the monitoring; and
determining a data value for the second pulse based on the at least one data value but not based on any data received during the first position.

62. The method of claim 61, wherein the determination of the data value for the second pulse is performed by an on-off keying.

63. The method of claim 61, wherein the determination of the data value for the second pulse comprises setting the data value for the second pulse equal to the at least one data value.

64. The method of claim 61, further comprising estimating at least one other data value for the first position based on the at least one data value, wherein the determination of the data value for the second pulse comprises setting the data value for the second pulse equal to the estimated at least one other data value.

65. The method of claim 61, wherein the determining of the data value for the second pulse is based on at least one adaptable criterion.

66. The method of claim 61, wherein the determining of the data value for the second pulse is triggered by a determination that data is not received during the first position or that any data received during the first position is not sufficiently accurate.

67. The method of claim 61, further comprising determining a quantity of samples associated with the first position that is affected by the transmission of the first pulse, wherein the determining of the data value for the second pulse is based on the determined quantity.

68. An apparatus for wireless communication, comprising:
a collision detector configured to determine that transmission of a first pulse by a node occurs during a first position of a plurality of pulse position modulation (PPM) positions defined for receiving a second pulse at the node; and
a receiver configured to monitor for the second pulse during a second position of the PPM positions, wherein the receiver comprises:
a sampler configured to determine at least one data value for the second position of the PPM positions based on the monitoring; and
a decoder configured to determine a data value for the second pulse based on the at least one data value determined by the sampler but not based on any data received during the first position.

69. The apparatus of claim 68, wherein the determination of the data value for the second pulse is performed by an on-off keying.

70. The apparatus of claim 68, wherein the determination of the data value for the second pulse comprises setting the data value for the second pulse equal to the at least one data value.

71. The apparatus of claim 68, wherein the receiver further comprises a receive data specifier configured to estimate at least one other data value for the first position based on the at least one data value determined by the sampler, wherein the determination of the data value for the second pulse by the decoder comprises setting the data value for the second pulse equal to the estimated at least one other data value.

72. The apparatus of claim 68, wherein the decoder is further configured to determine the data value for the second pulse based on at least one adaptable criterion.

73. The apparatus of claim 68, wherein the decoder is further configured to determine the data value for the second pulse based on a determination that data is not received during the first position or that any data received during the first position is not sufficiently accurate.

74. The apparatus of claim 68, wherein:
the collision detector is further configured to determine a quantity of samples associated with the first position that is affected by the transmission of the first pulse; and
the decoder is further configured to determine the data value for the second pulse based on the determined quantity.

75. An apparatus for wireless communication, comprising:
means for determining that transmission of a first pulse by a node occurs during a first position of a plurality of pulse position modulation (PPM) positions defined for receiving a second pulse at the node; and
a receiver configured to monitor for the second pulse during a second position of the PPM positions, wherein the receiver comprises:
sampler means for determining at least one data value for the second position of the PPM positions based on the monitoring; and
decoder means for determining a data value for the second pulse based on the at least one data value determined by the sampler means but not based on any data received during the first position.

76. The apparatus of claim 75, wherein the determination of the data value for the second pulse is performed by an on-off keying.

77. The apparatus of claim 75, wherein the determination of the data value for the second pulse comprises setting the data value for the second pulse equal to the at least one data value.

78. The apparatus of claim 75, wherein the receiver further comprises means for estimating at least one other data value for the first position based on the at least one data value determined by the sampler means, wherein the determination of the data value for the second pulse by the decoder means comprises setting the data value for the second pulse equal to the estimated at least one other data value.

79. The apparatus of claim 75, wherein the decoder means is configured to determine the data value for the second pulse based on at least one adaptable criterion.

80. The apparatus of claim 75, wherein the decoder means is configured to determine the data value for the second pulse based on a determination that data is not received during the first position or that any data received during the first position is not sufficiently accurate.

81. The apparatus of claim 75, wherein:
the means for determining that transmission of the first pulse by the node occurs during at least one position is configured to determine a quantity of samples associated with the first position that is affected by the transmission of the first pulse; and
a decision to not determine the data value for the second pulse based on any data received during the first position is based on the determined quantity.

82. A computer-program product for wireless communication, comprising:
a non-transitory computer-readable medium encoded with codes executable by a processor to:
determine that transmission of a first pulse by a node occurs during a first position of a plurality of pulse position modulation (PPM) positions defined for receiving a second pulse at the node;
monitor for the second pulse during a second position of the PPM positions;
determine at least one data value for the second position of the PPM positions based on the monitoring; and
determine a data value for the second pulse based on the at least one data value but not based on any data received during the first position.

* * * * *